United States Patent
Dunne (10) Patent No.: US 6,902,667 B1
(45) Date of Patent: Jun. 7, 2005

(54) FLUID TREATMENT SYSTEM (75) Inventor: Patrick F. Dunne, Regina (CA)

(73) Assignee: 3C Water Systems Ltd., Lumsden (CA)

( * ) Notice: Subject to any disclaimer, the term of this patent is extended or adjusted under 35 U.S.C. 154(b) by 0 days.

(21) Appl. No.: 09/937,787

(22) PCT Filed: Mar. 23, 2000

(86) PCT No.: PCT/CA00/00309
§ 371 (c)(1),
(2), (4) Date: Sep. 28, 2001

(87) PCT Pub. No.: WO00/59835
PCT Pub. Date: Oct. 12, 2000

(30) Foreign Application Priority Data

Mar. 31, 1999 (CA) ............................................. 2267677

(51) Int. Cl.$^7$ ................................................ C02F 1/32
(52) U.S. Cl. ........................ 210/173; 210/181; 210/182; 210/199; 210/202; 210/205; 210/257.1; 210/258; 210/519
(58) Field of Search ................................ 210/808, 151, 210/173, 175, 181, 182, 192, 199, 198.1, 202, 205, 206, 207, 257.1, 258, 512.1, 519, 203

(56) References Cited

U.S. PATENT DOCUMENTS

| 3,523,076 A | * | 8/1970 | Goerz, Jr. et al. | 210/609 |
| 3,772,187 A | * | 11/1973 | Othmer | 210/622 |
| 3,899,423 A | * | 8/1975 | McGrath | 210/199 |
| 3,933,642 A | * | 1/1976 | Wilson | 210/206 |
| 4,219,415 A | * | 8/1980 | Nassef et al. | 210/184 |
| 4,225,431 A | * | 9/1980 | De Longe | 210/617 |
| 4,357,242 A | * | 11/1982 | Chandler | 210/712 |
| 4,451,361 A | * | 5/1984 | Paterson | 210/136 |
| 4,501,664 A | * | 2/1985 | Heil et al. | 210/614 |
| 5,080,803 A | * | 1/1992 | Bagatto et al. | 210/709 |
| 5,407,561 A | * | 4/1995 | Iida et al. | 210/86 |
| 5,556,537 A | * | 9/1996 | Saarenketo | 210/151 |
| 5,770,056 A | * | 6/1998 | Deskins | 210/136 |
| 5,833,865 A | * | 11/1998 | Harato et al. | 210/733 |
| 5,904,855 A | * | 5/1999 | Manz et al. | 210/709 |
| 6,113,789 A | * | 9/2000 | Burke | 210/609 |
| 6,261,446 B1 | * | 7/2001 | Cornick | 210/173 |

FOREIGN PATENT DOCUMENTS

| CA | 2212503 | * | 11/1997 |
| EP | 0787686 A2 | * | 8/1997 |
| WO | WO 98/38134 | * | 9/1998 |

* cited by examiner

Primary Examiner—Peter A. Hruskoci
(74) Attorney, Agent, or Firm—Adams Evans P.A.

(57) ABSTRACT

A method and apparatus for the removal of suspended solids from water, waste water and other effluents is disclosed. The raw fluid being extracted is placed in a pressurized equalization chamber by a pumping apparatus. The fluid might be ground in advance to reduce the size of solid particles suspended therein to a manageable size. Solids can settle from the fluid before pumping into a second chamber for further setting. Chemicals are injected between the first and second chambers. The sludge recovered from from the base of the chambers can be sterilized using conventional methods, and the separated fluid discharged from the clarification chamber is further cleaned, also using conventional methods. The method and apparatus of the present replaces or supplements conventional mainframe biological treatments.

41 Claims, 4 Drawing Sheets

FLUID TREATMENT SYSTEM

This application is a U.S. National Stage patent application based on International Application No. PCTCA00/00309 filed Mar. 23, 2000 and claims priority of Canadian Patent No. 2,267,677.

This invention relates to a method and apparatus for the removal of solid matter from water or other fluids in which a chemical or chemicals are introduced into the fluid under pressure to coagulate the solid materials and cause them to be dropped out of the treatment system and be removed.

BACKGROUND

At present, most methods of treatment of water, waste water or other effluent are mainframe biological treatments. These systems are costly and highly inefficient, due in part to inefficiencies created by shock loadings which destroy the biological components of the treatment train.

Previous attempts to produce a treatment system which can compete with and exceed biological performance, and lower costs, have not been successful.

It would be desirable to provide a simple and efficient alternative or supplement to a mainframe biological system which will allow for full treatment of a fluid without the attendant risks of conventional mainframe biological systems.

It would also be desirable to provide a lower cost alternative to the mainframe biological systems currently employed in the art.

SUMMARY OF THE INVENTION

It is the object of the present invention to provide a raw fluid treatment apparatus and method which can be used to remove solids from raw waste water or other fluids in a more efficient and reliable and less costly manner than the methods currently practised in the art.

The object of the present invention is to provide an apparatus or method which can be used to replace or supplement a mainframe biological system which will allow for full treatment of a fluid without the attendant risks of mainframe biological systems.

The present invention, a fluid treatment apparatus for the removal of solids from fluids, accomplishes its objectives comprising substantially a pumping apparatus, an equalization chamber operatively attached to the pumping apparatus, said equalization chamber having a base and a top and including an equalization solids discharge at the base of the equalization chamber; a clarification chamber operatively attached to the top of the equalization chamber via a second stage fluid transfer conduit, said clarification chamber having a base and a top and including a clarification solids discharge at the base of the clarification chamber; a second stage chemical injection apparatus operatively attached to the second stage fluid transfer conduit; and a separated fluid discharge at the top of the clarification chamber; wherein raw fluid containing suspended solids is pumped by the pumping apparatus into the equalization chamber where a portion of the solids contained in the raw fluid, being equalization recovered solids, can settle to the base of the equalization chamber for removal via the equalization solids discharge, the raw fluid then being partially separated fluid which moves into the second stage fluid transfer conduit where a chemical can be injected into the partially separated fluid by the second stage chemical injection apparatus before the arrival of the said partially separated fluid in the clarification chamber, where solids remaining suspended in the partially separated fluid can settle to the base of the clarification chamber for removal via the clarification solids discharge, the separated fluid then being discharged from the clarification chamber by the separated fluids discharge; and wherein the equalization and clarification recovered solids can be removed from their respective chambers via the equalization solids discharge and the clarification solids discharge; and wherein the fluid treatment apparatus between the pumping apparatus and the separated fluids discharge is pressurized by the pumping apparatus. In this manner, solids-laden fluid can be separated within the fluid treatment apparatus, with the separated fluid and the recovered solids being discharged from the apparatus without negatively affecting the pressure within the apparatus as a whole.

Downstream fluid processing apparatus could be attached to the basic embodiment of the invention beyond and via the separated fluids discharge, through which the separated fluid could be further processed or cleaned in advance of its ultimate use. Similarly, downstream solids sterilization apparatus could be attached to the equalization solids discharge and clarification solids discharge in order to sterilize the solids as they are discharged from the chambers.

Upon this basic configuration of the apparatus of the present invention, various modifications or adaptations can be made to particularly configure the device for use in particular cleaning situations. It will be understood that both any such adaptations as are obvious to one skilled in the art, as well as this basic configuration disclosed herein, are contemplated within the scope of the present invention.

A first stage fluid transfer conduit might be added between the pumping apparatus and the equalization chamber. The first change which might be made to the basic embodiment of the invention would be to add first stage chemical injection apparatus operatively connected to the first stage fluid conduit between the pumping apparatus and the equalization chamber, whereby chemicals could be injected into the raw fluid as the raw fluid is being pumped into the equalization chamber.

Either the second stage chemical injection apparatus or the optional first stage chemical injection apparatus could be a mazi injector or some other method of high pressure jet injection of the chemicals such that maximum penetration and mixing of the fluid by the injection is achieved.

Mixing areas could be provided within the fluid transfer conduits to better provide for the mixing of the fluid carried therein with injected chemicals, or for simple agitation of the fluid as it travels through the conduit. For example, in the case of the first stage fluid transfer conduit, a mixing area could be provided beyond the first stage chemical injection apparatus by simply extending the length of the first stage fluid transfer conduit.

In some cases, where the first stage fluid transfer conduit was lengthened considerably to provide ample mixing room within the first stage fluid transfer conduit, the first stage fluid transfer conduit might be wrapped around the perimeter of the equalization chamber before it enters the equalization chamber, in order to cut down on the footprint of the device as a whole. Similar to the case of the first stage fluid transfer conduit, the second stage fluid transfer conduit could also be adapted to provide a mixing area for the partially separated fluid and the injected chemicals before entry into the clarification chamber. As in the case of the extension of the first stage fluid transfer conduit discussed above where the second stage fluid transfer conduit is extended a considerable length to provide an ample mixing area within the conduit, the second stage fluid transfer conduit could be wrapped around the outer perimeter of the clarification chamber before entering the clarification chamber, in order to provide a maximum mixing area with a lower footprint for the device as a whole.

In the case of both the first stage fluid transfer conduit and the second stage fluid transfer conduit, these items could be fitted with internal fighting or other internal measures to provide for additional agitation or mixing of the fluid being carried therein. Various fighting designs could be conceived; the particulars of which are not as essential to the present invention as the concept of the addition thereof.

The equalization solids discharge could be a valve, as could be the clarification solids discharge, these valves could be automated along with the implementation of an instrumentation package on the entire apparatus, which would allow for its unattended and automated operation.

The equalization solids discharge and the clarification solids discharge might be joined into a single solids discharge conduit by which a single conduit would carry the solids recovered from the raw fluid off to the downstream solids sterilization apparatus.

A grinder might be added to grind any portions of the solids contained in the raw fluid to a manageable size before they enter the equalization chamber. It will be understood that various types of grinders would all be contemplated within the scope of the present invention.

The pumping apparatus might be one or more pumps. In the case where a grinder is used within the settlement reservoir, the functions of the grinder and the pumping apparatus could be combined in one or more grinding pumps.

A decoupling tank could be added to the apparatus by operative connection to the separated fluid discharge.

Downstream fluids processing apparatus could be used to clean the separated fluid drawn off at the top of the clarification chamber. The downstream fluids processing apparatus might comprise a sand filter, a biological polishing filter, and an ultraviolet disinfection unit in series. Alternatively, the downstream fluids processing apparatus might be a sand filter, a biological polishing filter, a chlorinator, a disinfection unit, or the like. By eliminating the need for a mainframe biological filter, the attendant risks of the mainframe system such as shock loading and biological colony kills are avoided.

A raw fluid collection system might be used for the collection and deposit of raw fluid in the settlement reservoir. Such a raw fluid collection system might be a gravity collection system, a vacuum collection system, or otherwise.

Various types of raw fluid could be processed, to yield various types of cleaned products. The raw fluid might include water, waste water, animal waste, water containing oil or grease, or industrial waste. It will be understood that the apparatus of the present invention has broad applications and that those applications and any attendant adaptations of the device are contemplated within the scope of the present invention.

The point of entry of the first stage fluid transfer conduit into the equalization chamber or the point of entry of the second stage fluid transfer conduit into the clarification chamber could be angled such that fluid exiting from the respective conduit in question would be directed towards or against the inner wall of the chamber in question. The advantage to this would be that in certain circumstances, such as where the chamber in question was approximately cylindrical, a circular flow of fluid would be generated within the chamber which would provide some additional centrifugal downward force for the drawing of solids down to the bottom or base of the chamber.

Downstream solids sterilization apparatus which might be used could be any number of conventional sterilization units. These might include a microwave treatment unit, a pasteurizer, a storage tank or a digester. The downstream solids sterilization apparatus might also comprise a gravity settling tank in which the solids recovered from the chambers would be allowed to settle for a period of time after which they would be treated biologically in a digester to yield digested solids. These digested solids then might be further processed by sterilization or other processes.

The present invention also discloses a method of processing raw fluid to remove suspended solids therefrom, wherein the method comprises pumping raw fluid into an equalization chamber and allowing a portion of the solids suspended in said raw fluid to settle to the base of said equalization chamber for removal; pumping this partially separated fluid from the equalization chamber into a clarification chamber, and injecting chemicals into said partially separated fluid before it enters said clarification chamber; allowing the remaining solids suspended in the partially separated fluid to settle to the base of the clarification chamber for removal; wherein the entire process up to the point of exit from the clarification chamber is conducted in a pressurized environment.

Chemicals could also be injected into the raw fluid before entry into the equalization chamber, in addition to the chemical injection between the clarification and equalization chambers. Mazi injectors, or other methods of high pressure injection, could be employed.

Where the solids were removed from the equalization chamber via an equalization solids discharge, or were removed from the clarification chamber by a clarification solids discharge, they could then be moved further along to a downstream solids sterilization apparatus which might use pasteurization, digestion, microwave treatment or other methods of cleaning or sterilizing the solids recovered from the equalization chamber and the clarification chamber.

The method might also be adapted by grinding the solids contained in the raw fluid to a manageable size before pumping the raw fluid into the equalization chamber.

The fluid could be mixed in advance of entry into the equalization chamber, or in advance of entry into the clarification chamber, to allow for floc formation or otherwise required intermingling of the fluid along with whatever agent or agents may have been injected.

In the method of the present invention, the downstream fluid processing could be done by sand filtration, biological polishing, or ultraviolet disinfection or some combination thereof.

Both the downstream fluid processing as well as the downstream sterilization of the solids recovered from the fluid separation process could be conducted in either a pressurized or non-pressurized system beyond their point of discharge from the equalization or clarification chambers.

The method and process of the present invention provide for superior cleaning of waste water and removal of solids therefrom, more reliably and with more costs efficiency, than mainframe biological treatment systems currently in use in the industry.

The system and apparatus of the present invention enjoys the advantage of a small footprint, modularity, closed system design, odor-free operation, ease of operation and low cost.

The system of the present invention can also be automated by the addition of instrumentation thereto.

When used alone, the system and apparatus of the present invention will meet enhanced primary treatment standards. Due to the modularity of the device insofar as different types of solids and fluid sterilization and a downstream cleaning apparatus being connected, the need for any ancillary technology to meet or achieve secondary to tertiary treatment standards can also be met.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

As outlined above, the present invention is a fluid treatment apparatus for the removal of suspended solids from waste water or other effluents. This device is used to separate any approximately solid fractions from waste water or other fluids. The solid fraction in many cases consists of a combination of grit and sludge. For the purposes of this patent specification and the remainder of the discussion herein, this combined grit and sludge being carried by raw fluid is referred to as raw solids.

While the invention and this application speak specifically of the use of this apparatus and method for the cleaning and recovery of solids from waste water, it is also foreseeable that other types of effluents might be cleaned using the same waste water treatment system and method of the present invention and it will be understood that all such wastes, fluids and otherwise are intended to fall within the scope of the present invention and its application.

Figure 1:
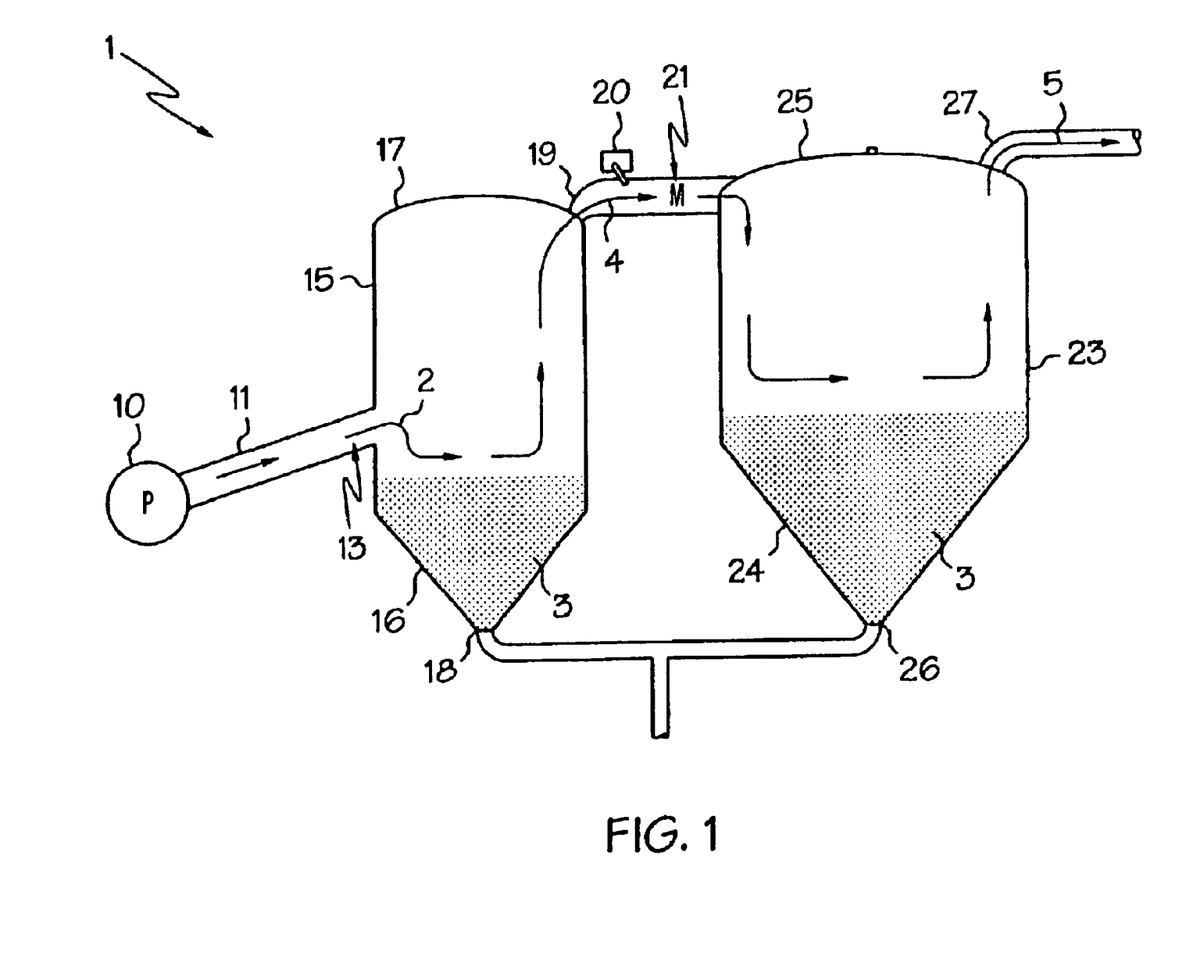
FIG. 1 is a diagram of one embodiment of the apparatus of the present invention.

Turning first to FIG. 1, a diagram of one basic embodiment of the apparatus of the present invention is shown. The fluid treatment apparatus (1) includes a pumping apparatus (10) which is operatively connected to an equalization chamber (15) which is operatively attached to the pumping apparatus (10) by way of a first stage fluid transfer conduit (11), said equalization chamber having a base (16) and a top (17) and including an equalization solids discharge (18) whereby settled solids can be removed from the base (16) of the equalization chamber (15), a clarification chamber (23) which is operatively attached to the top (17) of the equalization chamber (15) by the second stage fluid transfer conduit (19).

Also shown is a second stage chemical injection apparatus (20) which is operatively attached to the second stage fluid transfer conduit (19) and can inject chemicals into the partially separated fluid (4) as it passes through the second stage fluid transfer conduit (19).

The second stage chemical injection apparatus (20) could be a mazi injector or some other apparatus capable of accomplishing a high pressure deep injection of chemicals into the partially separated fluid (4) carried within the second stage fluid transfer conduit (19). The use of a high pressure jet of chemicals such as this would provide for maximum penetration and mixing of the chemical with the partially separated fluid (4). It will be understood that other types of injection apparatus other than a mazi injector could be used to place chemical into the flow of the partially separated fluid (4) through the second stage fluid transfer conduit (19) and that such alterations or adaptations as would be obvious to one skilled in the art are contemplated within the scope of the present invention.

The clarification chamber (23) again has a base (24) and a top (25), as well as a clarification solids discharge (26) at its base (24) whereby settled solids could again be removed from the clarification chamber (23) at its base (24).

The next element of this embodiment is a separated fluids discharge (27) at or near the top (25) of the clarification chamber (23). The separated fluids discharge (27) will allow for separated fluid (5) to exit from the clarification chamber (23).

The flow of raw fluid through this apparatus (1) to become clean fluid can be demonstrated as follows. Raw fluid (2) is pumped from the settlement reservoir (9) by the pumping apparatus (10) into the equalization chamber (15) via the first stage fluid transfer conduit (11). Once the raw fluid (2), which contains raw solids (3), enters the equalization chamber (15) a portion of the raw solids (3) will be able to settle to the base (16) of the equalization chamber (15), for eventual removal as equalization discharged solids. The fluid remaining, which still contains some amount of raw solids (3) becomes partially separated fluid (4) and can exit the equalization chamber (15) via the second stage fluid transfer conduit (19) to be pumped into the clarification chamber (23).

Upon exiting the equalization chamber (15) via the second stage fluid transfer conduit (19), the partially separated fluid (4) will be injected with chemical by the second stage chemical injection apparatus (20) before its entry into the clarification chamber (23).

Once inside the clarification chamber (23), the remainder of the solids (3) can settle to the base (24) of the clarification chamber for eventual removal as clarification discharged solids via the clarification solids discharge (26).

At this point, the fluid that remains is separated fluid (5) which can exit from the clarification chamber (23) via the separated fluid discharge (27) at or near the top thereof (25).

Key to the novelty and the operability of the invention is that the entire apparatus (1) is pressurized by the pumping apparatus (10) and the entire system beyond the pumping apparatus (10) to at least the separated fluid discharge (27) remains pressurized throughout its operation—ie. removal of separated fluid (5) via the separated fluid discharge (27), or the removal of solids by either the equalization solids discharge (18) or the clarification solids discharge (26) will not adversely affect the internal system pressure.

The first stage fluid transfer conduit (11) can provide a mixing area (13) for the raw fluid (2) before it enters into the equalization chamber (15).

In the case of the embodiment of FIG. 1, wherein the second stage chemical injection apparatus (20) is placing chemicals into the partially separated fluid (4), it is particularly important to ensure the even distribution and mixing of these chemicals into the partially separated fluid (4). This can be done by providing such a mixing area (21) within the second stage fluid transfer conduit (19), simply to allow for the space within which the chemicals and the partially separated fluid (4) can co-mingle in advance of entry into the clarification chamber (23). Allowing for the mixing of the fluid and the chemicals within the second stage fluid transfer conduit (19) will also allow for proper floc formulation.

In the embodiment of FIG. 1, the pumping apparatus (10) is a single pump. It will be understood that various types and numbers of pumps could be used depending on the system pressure required and other operational considerations. Insofar as any apparatus would provide adequate pressure to operate the system, those would be contemplated within the scope of the present invention.

The chemicals injected might be alum, polyaluminum chloride, or any other chemical or additive used to enhance floc formulation or otherwise treat effluents in advance of solid separation.

Figure 2:
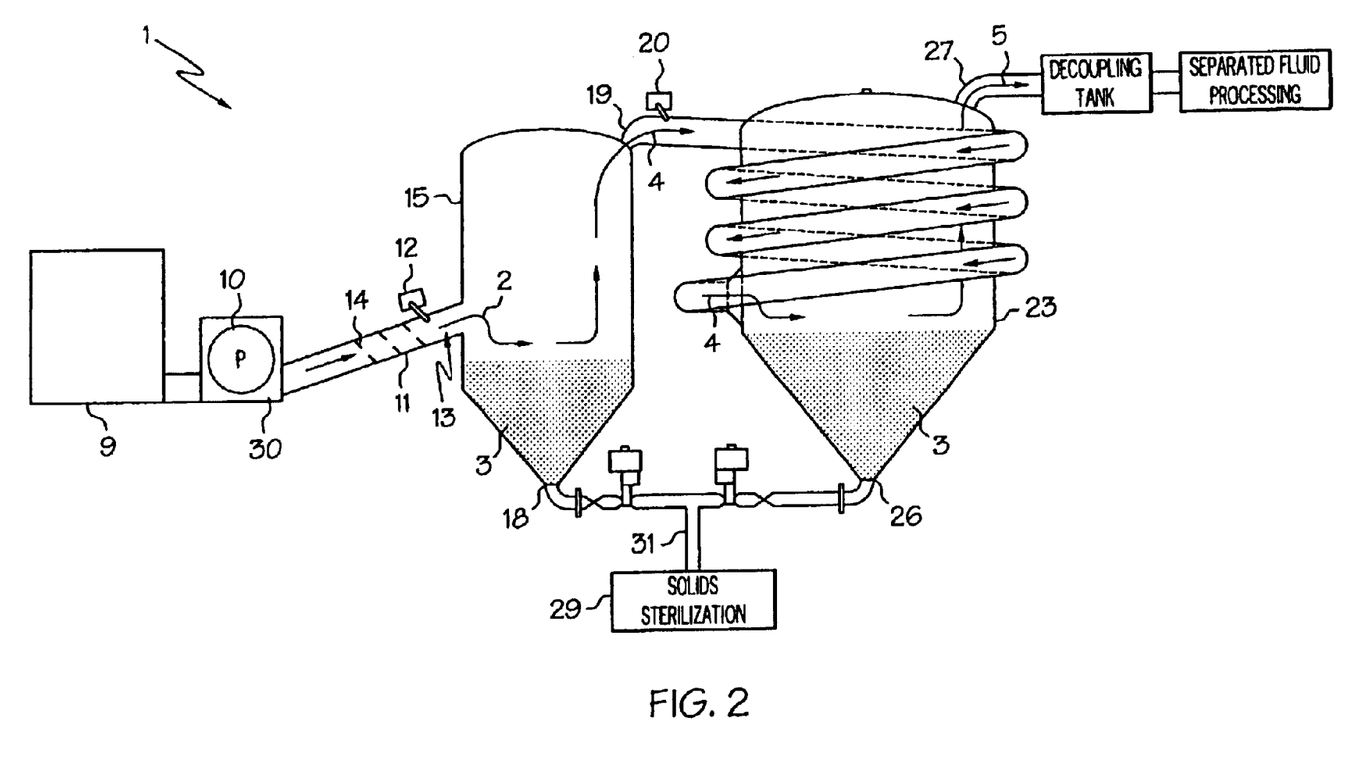
FIG. 2 shows another embodiment of the apparatus of the present invention, wherein the equalization chamber and the clarification chamber are cylindrical and a first stage chemical injection apparatus is added.

FIG. 2 shows another embodiment of the apparatus of the present invention, to which several enhancements are added to the basic embodiment. Shown is a method of further increasing the mixing ability of the fluids carried within the conduit (19). This is done by considerably extending the length of the conduit (19). In order to do this and maintain the smaller footprint of the overall apparatus (1), it is shown in FIG. 2 that the fluid transfer conduit (19) could be wrapped around the clarification chamber (23).

Also shown in FIG. 2 is a first stage chemical injection apparatus (12) which is operatively connected to the first stage fluid transfer conduit (11) between the pumping apparatus (10) and the equalization chamber (15), whereby chemicals can be injected into the raw fluid (2) before it enters into the equalization chamber (15). Again, while it is particularly contemplated that a mazi injector would provide a good chemical injection apparatus for use at this stage in the apparatus (1), it will be understood that various mechanisms could be used to inject chemicals into the raw fluid (2) at this point.

It will also be understood that fitting the interior of the first stage fluid transfer conduit (11) with internal fighting (14), as discussed in more detail with respect to the second stage fluid transfer conduit (19) in relation to FIG. 1, the action of the mixing of the raw fluid (2) within the first stage fluid transfer conduit (11) could be increased or improved.

As shown in FIG. 2, both the equalization solids discharge (18) and the clarification solids discharge (26) are valves. These valves can be opened and the solids contained at the base of their respective chambers would then be evacuated therefrom using the internal system pressure. While valves are particularly contemplated for use as the discharges (18) and (26), it will be understood that other various types of gates or dispensing mechanisms could also be used with the same result and insofar as such items are obvious to one skilled in the art they will be contemplated as well within the scope of the present invention.

Also demonstrated in FIG. 2 is a single solids discharge conduit (31), which is essentially a gathering conduit off of the equalization solids discharge/valve (18) and the clarification solids discharge/valve (26). The single solids discharge conduit (31) then leads into the downstream solids sterilization apparatus (29).

FIG. 2 also shows a grinder (30) within the settlement reservoir (9) which can be used to grind the raw solids (3) to a manageable size before the raw solids (3) enter the first stage fluid transfer conduit (11) in combination with the raw fluid (2). Again, it will be understood that various types of grinding apparatus can be used insofar as each will accomplish the objective of sufficiently reducing the size of the raw solids (3) to a manageable size to be handled by the remainder of the apparatus (1), those are contemplated within the scope of the present invention also.

It is particularly contemplated within the scope of the embodiment shown in FIG. 2 that the grinding apparatus (30) and the pumping apparatus (10) would be combined into a grinding pump. In FIG. 2, a plurality of grinding pumps (10) is shown.

The embodiment of FIG. 2 also demonstrates the generation of a circular fluid flow pattern within the equalization chamber by aiming the entry of the first stage fluid transfer conduit (11) in the direction of the wall of the equalization chamber (15) which is cylindrical. Similar effect could be accomplished in the clarification chamber (23) by the second stage fluid transfer conduit (19) if desired.

The downstream solids sterilization apparatus shown at (29) can comprise any number of different conventional sterilization apparatus. For example, it might be a pasteuriser, a storage tank, a digester, or some other sterilizing unit or combination of these. It is also contemplated that microwave treatment might be used to treat the solids accumulated within the downstream solids sterilization apparatus (29).

Figure 3:
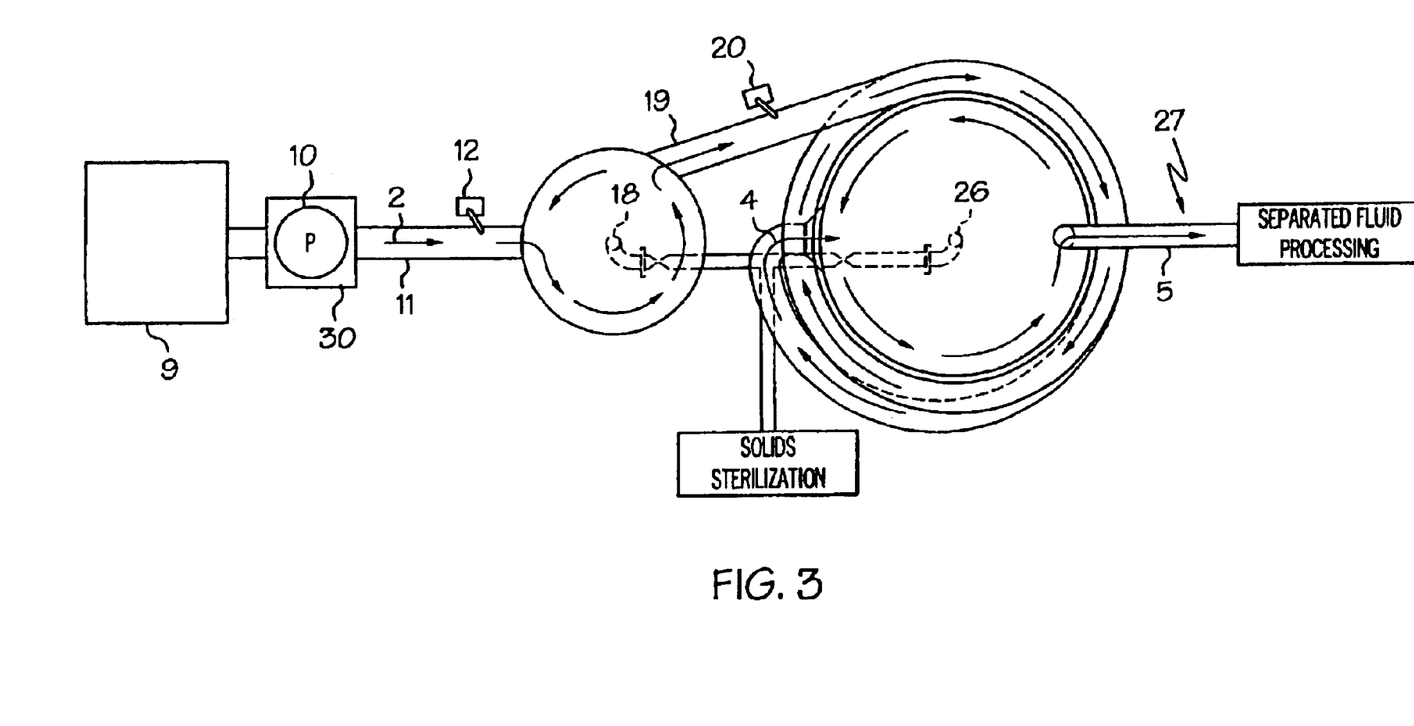
FIG. 3 is a top view of the embodiment of FIG. 2.

FIG. 3 shows the embodiment of FIG. 2 from a top view.

Figure 4:
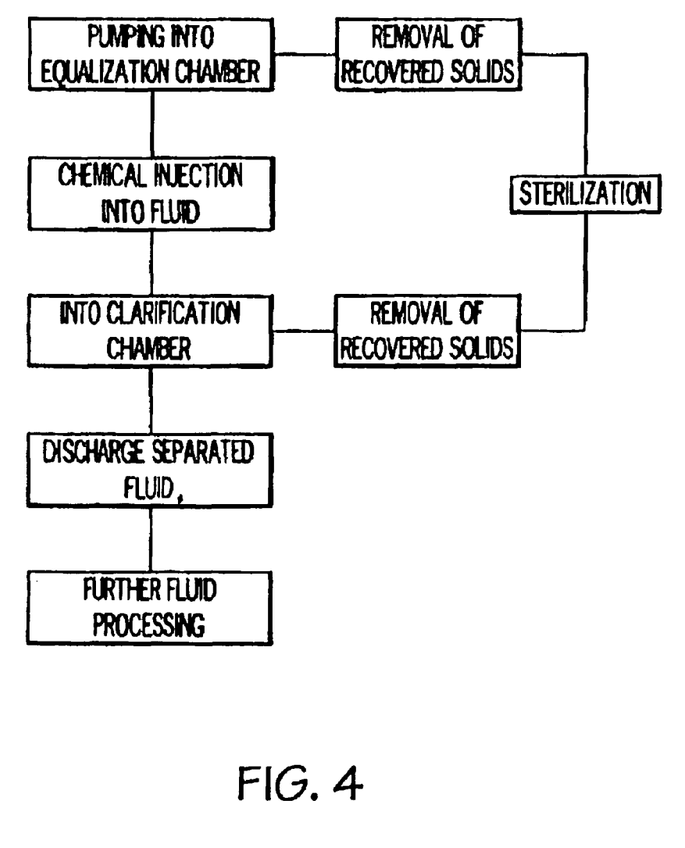
FIG. 4 is a flow diagram of the process of the present invention.

The method of the present invention is demonstrated in the flow diagram of FIG. 4.

The method comprises pumping raw fluid with solids suspended therein into an equalization chamber, where a portion of the solids suspended therein are allowed to settle off for removal. The partially separated fluid is then pumped from the equalization chamber into a clarification chamber, chemical injection taking place before the partially separated fluid enters the clarification chamber. More of the suspended solids are settled off in the clarification chamber and separated fluid is removed from the clarification chamber for further downstream fluid processing. The recovered solids are sent to downstream sterilization.

Chemicals could also be injected into the raw fluid before entry into the equalization chamber.

The raw fluid might be ground in advance of entry into the equalization chamber, in order to reduce any suspended solids therein to uniform and manageable size.

The process of the present invention might be carried out with any embodiment of the apparatus of the present invention, or with other alternative equipment accomplishing the same goals, and it will be understood that the use of any equipment to carry out the process of the present invention is contemplated within the scope of the claims.

The recovered solids could be further sterilized by pasteurization, digestion, microwave or other conventional methods. The separated fluid could be further processed using any number of conventional methods including sand filtration, biological filtration, ultraviolet disinfection, chlorination or the like.

The process of separating the fluids from the solids is carried out in a pressurized environment. The further downstream processing of the separated fluid or the recovered solids may be conducted in a pressurized environment or not, depending on the circumstances and cleaning methods being employed.

The following examples are intended to illustrate the varied methods and uses of the method and apparatus of the present invention in cleaning or yielding various cleaned fluids.

Illustration 1: Waste Water Treatment in Accordance with the Method and Apparatus of the Present Invention A raw waste water collection system could be used, including a gravity collection system, to move raw waste water into the settlement reservoir. In the settlement reservoir, grinding pumps grind and shred the solids suspended in the waste water, to a size where they will not plug or jam the treatment system. The grinding pumps will then move the raw fluid into the equalization chamber.

Within the equalization chamber the forces of pressure and gravity, coupled with the circular motion created by angling the entry of the fluid towards the wall of the cylindrical chamber, create downward pressure resulting in the settling of solids from to if the fluid.

The partially separated fluid is then pumped into the clarification chamber, after receiving a rapid and forceful injection of chemical treatment such as alum. The chemically treated partially separated fluid moves through lengthened portions of the second stage fluid transfer conduit which allows time for floc formulation in advance of entry into the clarification chamber. A vast majority of the remaining solids will then settle to the base of the clarification chamber.

The settled solids or sludge are removed from the base of the equalization chamber and the clarification chamber for further cleaning and sterilization. The separated fluid exiting the clarification chamber passes through a decoupling tank and into a downstream fluid processing system where it can be further cleaned.

Illustration 2: Production of Potable Water Using the Method and Apparatus of the Present Invention Source water drawn from a lake or other source is pumped into an equalization chamber. Grit and solids can settle out within the equalization chamber, for removal at the base of same.

The water from the equalization chamber is pumped to a clarification chamber, and injected with alum or polyaluminumchloride on the way into the clarification chamber. Floc formulation takes place and the remainder of the solids contained in the water can be settled off in the clarification chamber.

The clarified water moves into a sand filtration system where remaining solids or impurities can be removed. It can then be chlorinated or handled through a MIOX system, to yield treated potable water.

The recovered solids can be further treated for sterilization purposes, or disposed of.

Illustration 3: Oil and Grease Removal in Accordance with the Method and Apparatus of the Present Invention Water contaminated by oil and grease is pumped into an equalization chamber, but first is injected with floc-forming chemicals. The inside of the fluid transfer conduits might be fitted with internal fighting to provide more aggressive mixing and floc forming conditions.

The chemically treated water is eventually moved to a clarification chamber where the vast majority of the oil and grease settle off as sludge. The treated water would at this point contain minimal amounts of oil and grease and could be safely discharged. The recovered sludge could be used as a fuel for steam generation or other uses.

Thus it can be seen that the invention accomplishes all of its stated objectives. The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

I claim:

1. A fluid treatment apparatus for the removal of solids from fluids, said apparatus comprising:
   a) a pumping apparatus (10);
   b) an equalization chamber (15) operatively attached to said pumping apparatus (10) via a first stage fluid transfer conduit (11), said equalization chamber having a base (16) and a top (17) and including an equalization solids discharge (18) at the base of the equalization chamber;
   c) a clarification chamber (23) operatively attached to the top of the equalization chamber via a second stage fluid transfer conduit (19), said clarification chamber having a base (24) and a top (25) and including a clarification solids discharge (26) at the base of the clarification chamber;
   d) a second stage chemical injection apparatus (20) operatively attached to the second stage fluid transfer conduit;
   e) a seperate fluid discharge (27) from clarification chamber;
   wherein raw fluid containing solids suspended therein is pumped by the pumping apparatus into the equalization chamber where a portion of the solids contained in the raw fluid, being equalization recovered solids, can settle to the base of the equalization chamber for removal via the equalization solids discharge, the raw fluid then becoming partially separated fluid which moves into the second stage fluid transfer conduit where chemical can be injected into the partially separated fluid by the second stage chemical injection apparatus before the arrival of said partially separated fluid in the clarification chamber where solids remaining in the partially separated fluid can settle to the base of the clarification chamber for removal via the clarification solids discharges, the seperated fluid then being discharged from the clarification chamber by the separated fluids discharge;
   and wherein the fluid treatment apparatus between the pumping apparatus and the separated fluids discharge is pressurized by, the pumping apparatus.

2. The apparatus of claim 1 further comprising first stage chemical injection apparatus (12) operatively connected to the first stage fluid transfer conduit between the pumping apparatus and the equalization chamber.

3. The apparatus of claim 2 wherein the first stage chemical injection apparatus is a mazi injector.

4. The apparatus of claim 1 wherein the second stage chemical injection apparatus is a mazi injector.

5. The apparatus of claim 1 wherein the first stage fluid transfer conduit provides a mixing area (13) for the raw fluid before entering into the equalization chamber.

6. The apparatus of claim 1 wherein the first stage fluid transfer conduit is wrapped around the equalization chamber before entering the equalization chamber.

7. The apparatus of claim 1 wherein the second stage fluid transfer conduit provides a mixing area (21) for the partially seperated fluid before entry into the clarification chamber.

8. The apparatus of claim 1 wherein the second stage fluid transfer conduit is wrapped around the clarification chamber before entering the clarification chamber.

9. The apparatus of claim 1 wherein the interior of the first stage fluid transfer conduit is fitted with internal fighting (14) to provide for agitation or mixing of the raw fluid before entry into the equalization chamber.

10. The apparatus of claim 1 wherein the interior of the second stage fluid transfer conduit is fitted with internal fighting (14) to provide for agitation or mixing of the partially separated fluid before entry into the clarification chamber.

11. The apparatus of claim 1 further comprising a decoupling tank operatively connected to the separated fluid discharge.

12. The apparatus of claim 1 wherein the equalization solids discharge is a valve.

13. The apparatus of claim 1 wherein the clarification solids discharge is a valve.

14. The apparatus of claim 1 further comprising downstream solids sterilization apparatus (29) operatively connected to the equalization solids discharge and the clarification solids discharge.

15. The apparatus of claim 14 wherein the downstream solids sterilization apparatus is a pasteurizer.

16. The apparatus of claim 14 wherein the downstream solids sterilization apparatus is a storage tank.

17. The apparatus of claim 14 wherein the downstream solids sterilization apparatus is a digester.

18. The apparatus of claim 1 wherein the pumping apparatus is a pump.

19. The apparatus of claim 1 wherein the pumping apparatus is a plurality of pumps.

20. The apparatus of claim 1 further comprising a grinder (30) ahead of the pumping apparatus to grind the raw fluid in advance of pumping.

21. The apparatus of claim 20 wherein the grinder and the pumping apparatus are combined as a grinding pump.

22. The apparatus of claim 20 wherein the grinder and the pumping apparatus are combined as a plurality of grinding pumps.

23. The apparatus of claim 1 further comprising downstream fluids processing apparatus operatively attached to the separated fluid discharge.

24. The apparatus of claim 23 wherein the downstream fluids processing apparatus comprises:
   a) a sand filter;
   b) a biological treatment filter; and
   c) an ultraviolet disinfection unit.

25. The apparatus of claim 23 wherein the downstream fluids processing apparatus is a sand filter.

26. The apparatus of claim 23 wherein the downstream fluids processing apparatus is a biological treatment filter.

27. The apparatus of claim 23 wherein the downstream fluids processing apparatus is a chlorinator.

28. The apparatus of claim 23 wherein the downstream fluids processing apparatus is an ultraviolet disinfection unit.

29. The apparatus of claim 1 further comprising a settlement reservoir (9) operatively attached to the pumping apparatus for the collection and storage of raw fluid in advance of pumping into the equalization chamber.

30. The apparatus of claim 1 further comprising a raw fluid collection system.

31. The apparatus of claim 30 wherein the raw fluid collection system is a gravity collection system.

32. The apparatus of claim 30 wherein the raw fluid collection system is a vacuum collection system.

33. The apparatus of claim 1 wherein the first stage fluid transfer conduit enters the equalization chamber at an angle such that raw fluid entering the equalization chamber is directed towards or against the inner wall of the equalization chamber.

34. The apparatus of claim 33 wherein the equalization chamber is approximately cylindrical in shape.

35. The apparatus of claim 1 wherein the second stage fluid transfer conduit enters the clarification chamber at an angle such that raw fluid entering the clarification chamber is directed towards or against the inner wall of the clarification chamber.

36. The apparatus of claim 35 wherein the clarification chamber is approximately cylindrical in shape.

37. The apparatus of claim 14 wherein the downstream solids sterilization apparatus comprises a gravity settling tank in which the solids are allowed to settle for a period of time, after which the thickened solids are treated biologically in a digester, yielding digested solids.

38. The apparatus of claim 14 wherein the downstream solids sterilization apparatus is a microwave treatment unit.

39. The apparatus of claim 1 wherein the clean fluid yielded is potable water.

40. The apparatus of claim 1 wherein the raw fluid used is groundwater.

41. The apparatus of claim 1 wherein the raw fluid used is waste water.

* * * * *